UNITED STATES PATENT OFFICE.

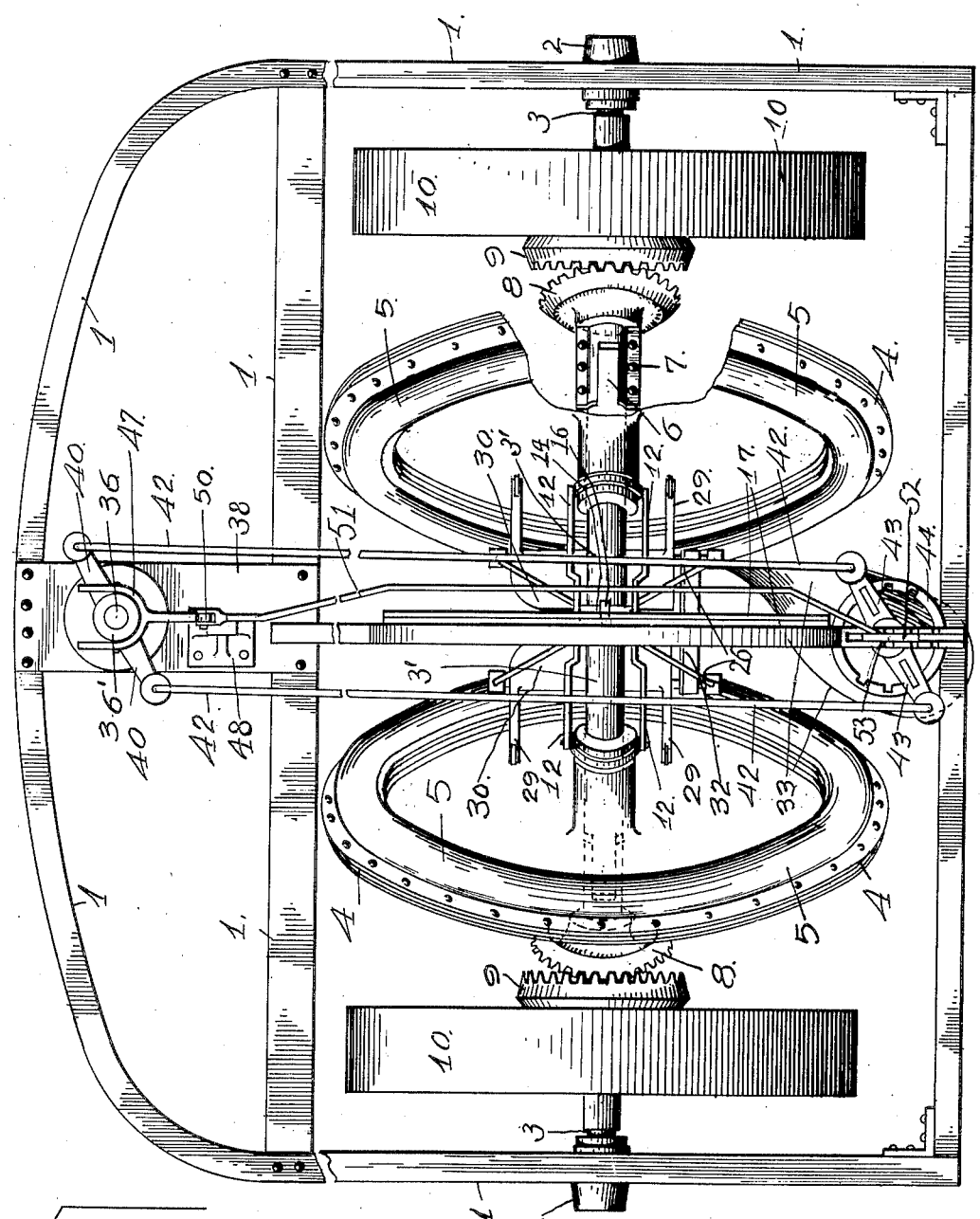

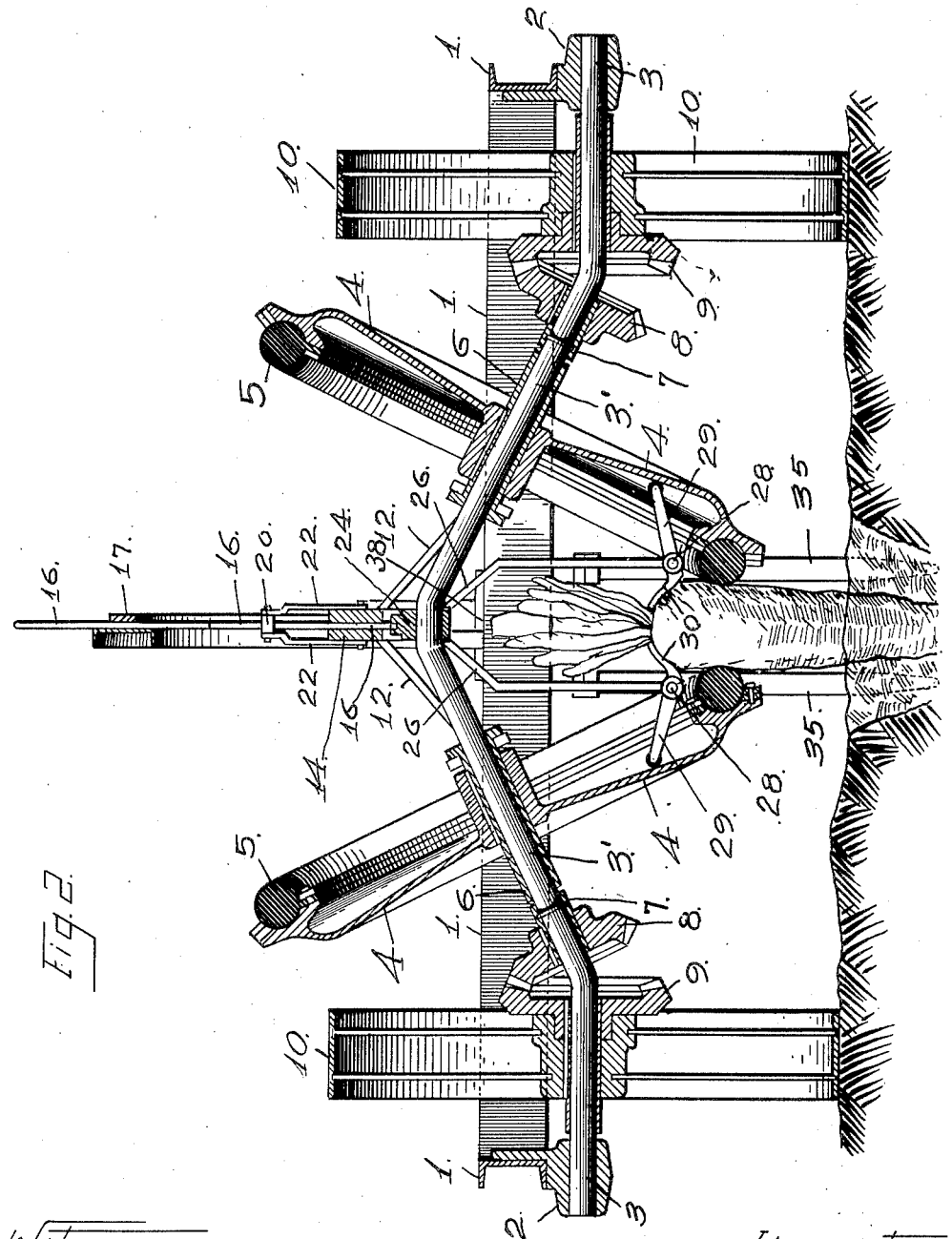

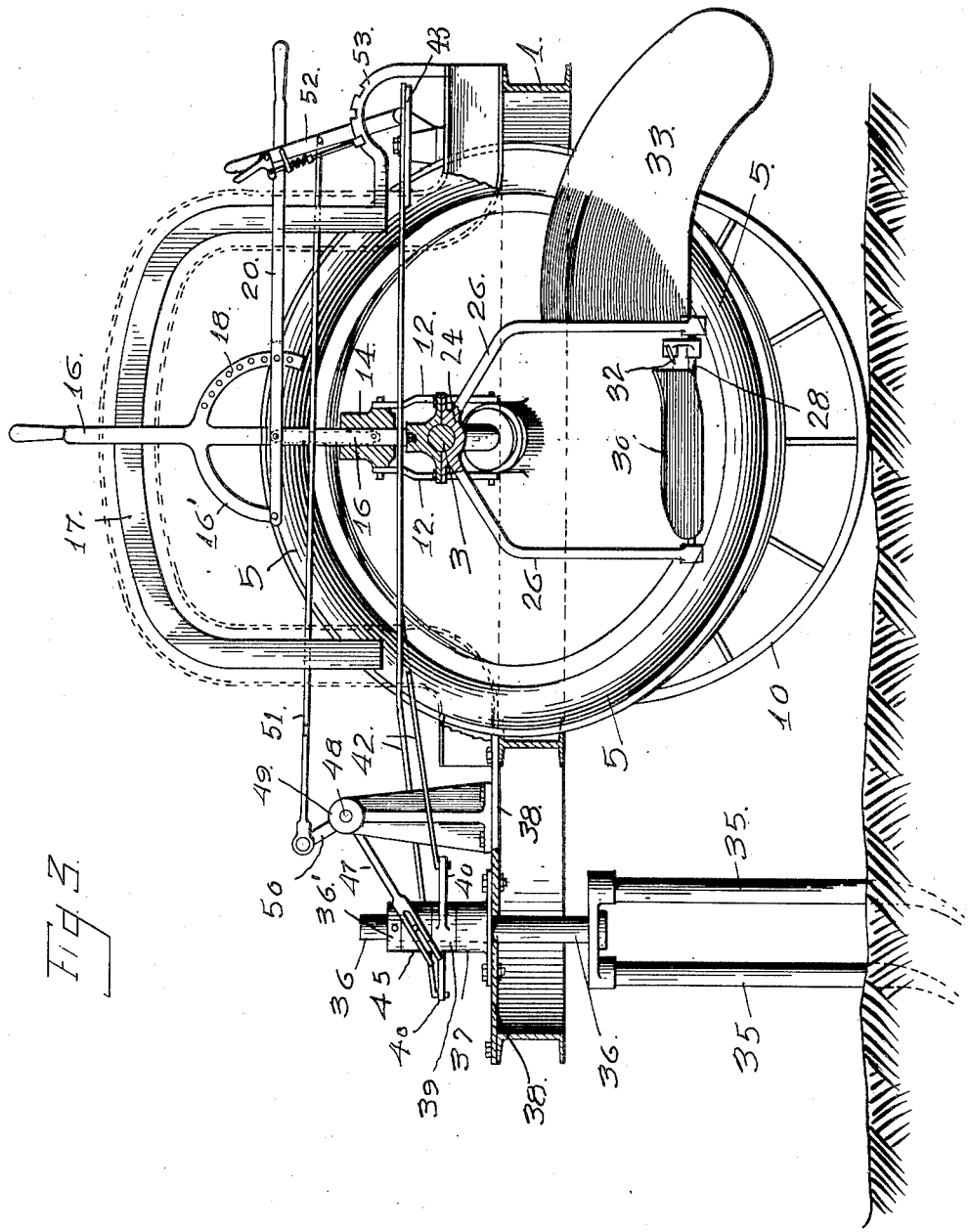

ANDREW C. DOUGLASS, OF SONOMA, CALIFORNIA.

BEET PULLING AND TOPPING MACHINE.

1,099,540.   Specification of Letters Patent.   Patented June 9, 1914.

Application filed April 24, 1913. Serial No. 763,446.

*To all whom it may concern:*

Be it known that I, ANDREW C. DOUGLASS, a citizen of the United States, and a resident of the city and county of Sonoma and State of California, have invented a new and useful Improvement in Beet Pulling and Topping Machines, of which the following is a specification.

My invention relates to beet pulling and topping machines wherein converging wheels, rotated by the traction of the vehicle and provided with cushioned rims, are adapted to engage and pull the growing beet from the ground after the said ground has been broken by a ground breaker on the front of the vehicle, after which the beet is carried to a blade which cuts the top therefrom and deposits the top in one row and the beet in another, and the objects of my invention are, first, to provide means for breaking the ground on both sides of the beet row, second, to provide converging wheels having cushioned rims adapted to engage and pull a beet without injuring or fracturing the skin, third, means for cutting off the tops of the beets, fourth, means for controlling the space between the converging wheels, and fifth, means for elevating and partially rotating the ground breaker.

For a full and clear comprehension of the device, reference should be had to the drawings forming a part of this specification, wherein similar numerals of reference designate similar parts throughout the said specification and drawings and in which—

Figure 1 is a broken plan view of the device with one of the converging wheels partly broken away in order to disclose the driving connections between the bevel gear and the wheel. Fig. 2 is a transverse vertical sectional view of the device showing the manner in which the converging wheels are rotatably mounted upon the supporting shaft. Fig. 3 is a longitudinal sectional view disclosing the means for operating the ground breaker, the knife for cutting off the tops of the beets and the deflecting plate which deflects the several tops to one side.

My invention consists mainly of a suitable frame 1 having the bearings 2 secured to the sides thereof. Within the bearings 2 is rotatably mounted a horizontal shaft 3 having oppositely inclined portions 3'. Wheels 4, having soft cushion rims 5, are rotatably mounted upon the bent portions 3' of the shaft 3, and are rotated by means of sliding connections 6 which engage similar connections 7 secured to bevel gears 8. The bevel gears 8 are in turn engaged and driven by means of the bevel gears 9 which are secured to the traction wheels 10 which are rotatably mounted upon the shaft 3. Parallel connecting links 12 are pivotally secured to the hubs of the wheels 4 at one end while the other ends of the links 12 are pivotally connected to a member 14 which is slidably mounted upon the lever 16. The lever 16 is held against movement by means of slots within the arcuate member 17. The lever 16 is provided with arms 16' and 18, the latter being provided with a plurality of apertures. A lever 20 is fulcrumed to the lower end of the arm 16' and is retained in position by means of a suitable pin which engages an aperture within the said lever 20 and one of the apertures within the arm 18. Parallel links 22 connect the lever 20 with the sliding member 14 upon the vertical lever 16. The lever 16 is rigidly secured to the shaft 3 by means of the collar 24. Four arms 26 are secured to the lower portion of the collar 24 and terminate in bearings which rotatably support the shafts 28 of the arcuate plates 30. The plates 30 are further provided with extensions 29 which engage the adjacent surfaces of the wheels 4. A knife 32 is set perpendicular to the plane of the radius of the wheels 4 on which it lies.

Parallel ground breakers 35 are rigidly secured to a suitable yoke secured to the lower end of a vertical shaft 36. The shaft 36 is slidably and rotatably mounted within the standard 37 secured to a plate 38 on the frame 1. A collar 39, having diametrically opposed arms 40, is feathered to the shaft 36. Suitable connecting rods 42 are connected to the outer ends of each arm 40 and to the arms 43 pivotally secured to the back of the frame 1 so that when the arms 43 are partially rotated the same movement will be transmitted to the arms 40 and consequently to the ground breakers 35. In this manner the members 35 will be brought closer to or farther away from the center of the beet row which lies parallel to and between the rods 42.

A collar 36' is rigidly secured to the upper end of the shaft 36 while a similar collar 45 is rotatably mounted on the said shaft and below the collar 36'. A bifurcated arm 47, pivotally secured to the standard 48, is adapted to engage the collar 45 for the purpose of raising the shaft 36 and the ground breakers 35 secured to the lower end thereof. This movement is accomplished by means of the arm 50, integral with the arm 47, which is in turn operated by means of the connecting rod 51, the other end of which is secured to and operated by the lever 52 adapted to be secured in any position by means of a suitable latch which engages the sector 53.

The operation is as follows: The machine is to be driven so that the ground breakers 35 travel and break the ground on each side of the beet row. In causing one ground breaker to precede the other, as illustrated in Fig. 3 of the drawings, the ground is furrowed on one side of the beet, first. As the other ground breaker proceeds, it not only breaks a furrow on the opposite side of the beet row, but breaks the beet partially out of the ground and slightly into the furrow made by the first ground breaker. This operation has the effect of loosening the beets in the ground so that they may be more easily extracted. In order to extract the beets from the ground without fracturing the skins, the converging wheels 4, having soft cushioned rims 5, are rotatably mounted upon the inclined portions 3' of the shaft 3, and are rotated thereon by means of the gears 8 and 9 as hereinbefore described. But the gears 8 being slightly smaller in diameter than the gears 9 which are secured to the traction wheels 10, it is evident that the wheels 4 will travel faster than the said wheels 10. For this reason a point on the lower portions of the wheels 4 instead of being stationary relative to the ground will be traveling backward. As the vehicle approaches a beet while traveling parallel with the beet row, the wheels 4 and the cushioned rims 5 thereon, pass on each side of the beet and as the said beet is forced between the lower portions of the rims 5, the said rims engage the beat by coming together and force the said beet backward and upward at the same time, thus loosening the beet and pulling it from the ground. If the gears 8 and 9 were of the same diameter the peripheral speed of the wheels 4 and the rims 5 thereon, would be the same as that of the traction wheels 10. This would result in the rims 5 traveling at the same speed as the traction wheels 10, consequently those points on the rims 5 which were grasping or engaging the beet would for an instant, be stationary, and as the vehicle passed, would produce a steady vertical pull on the beet. It is a well known fact that it would be easier to pull the beet from the ground by a backward or forward movement as well as an upward movement, than by a steady vertical pull. It is for this reason that the gears 8 and 9 are of a ratio that will slightly increase the speed of the wheels 4 and the rims 5. This will result in a backward movement of the lower portion of the rims 5 inasmuch as the lower portions of the traction wheels 10 are stationary and resting on the ground. As the beet is pulled from the ground by the rotation of the rims 5 it is carried upward and backward where a knife 32 cuts the top from the said beet. The top of the beet is deflected to one side by means of the deflecting plate 33 while the beet is dropped by the spreading or divergency of the rims 5 which hold it, back into the beet row. The amount of the top to be cut off is determined automatically by means of the arcuate plates 30 which are carried on the lower ends of the arms 26. These plates 30 engage the top of the beet as the same passes between the rims 5 and allow only a certain proportion of the beet top to extend inward beyond the rims 5. The arcuate plates 30 are maintained in their position by means of the extensions 29 which engage the inner surface of the wheels 4 and prevent the said plates from being forced upward. The rims 5 are adjusted for beets of different sizes and diameters by means of the lever 20. When operating in a beet field where the beets are all of small diameter, the lever 20 is raised, consequently raising the sleeve 14 on the vertical lever 16 by means of the links 22 which connect the said sleeve 14 with the said lever 20. The wheels 4 being connected to the sleeve 14 by means of the links 12, it is evident that the said wheels 4 will be drawn together when the sleeve 14 is raised. As the wheels 4 approach each other, the extensions 29 will be raised and the arcuate plates 30 will be lowered which will diminish the amount of the beet top extending within the rims 4, to be cut off by the knife 32. Also, while pulling and topping beets of a small diameter, the ground breakers 35 will be brought closer to the center of the beet row by partially rotating the vertical shaft 36. This is accomplished by means of the rods 42 which are secured to the pivotally mounted arms 43 secured to the back of the vehicle and the arms 40 which are secured to the said shaft 36.

In Fig. 1 of the drawings, one of the wheels 4 is partly broken away in order to disclose the manner in which the sleeve 7 is connected to the sleeve 6 upon which the said wheel 4 is mounted. The sleeve 6 is provided with extensions which engage the slots within the sleeve 7 which is secured to the gear 8. By means of this sliding connection, the wheels 4 may be brought together or separated without being disconnected from the driving mechanism.

It is evident from the foregoing that I have provided a machine which is adapted to pull and top beets of different diameters. It is also evident that I have provided means which will assist in the extraction of the beets from the soil by breaking the ground first on one side and then on the other side of the beet row, at the same time loosening the beet by breaking it partially into the furrow which was plowed by the first ground breaker. It is likewise apparent that I have provided means for extracting the beets from the soil with a forward and backward as well as a vertical movement, which will tend to loosen the said beet from the soil.

The details of construction are so susceptible to variation, that I do not wish to confine myself to the precise construction shown herein but rather to avail myself of any modification which may properly fall within the scope of my invention.

Having thus described my invention, what I claim as new and desire to secure by Letters Patent is—

1. In a beet pulling and topping machine, the combination of a rectangular frame having bearings secured to the sides thereof; a horizontal shaft having oppositely inclined portions and rotatably mounted within the bearings; wheels having cushioned rims rotatably mounted upon the inclined portions of the shaft so as to bring the peripheries of the cushioned rims closer together at the bottom than at the top for the purpose of engaging a growing beet between the lower peripheries of the cushioned rims and pulling the beet from the ground; traction wheels rotatably mounted upon the horizontal portions of the shaft and adapted to rotate the wheels on the inclined portions of the said shaft; a bifurcated ground breaker rotatably secured to the front of the frame and adapted to break the ground on both sides of a growing beet row; means for partially rotating the ground breaker; a knife suspended between the cushioned wheels and adapted to cut the top from a beet held between the cushioned rims of the wheels; means for altering the distance between the cushioned wheels without altering the angle thereof; and an inclined plate adapted to deflect the severed tops of the beets to one side of the beet row.

2. In a beet pulling and topping machine, the combination of a rectangular frame having bearings secured thereto; a horizontal shaft rotatably mounted in the bearings and having oppositely inclined portions; wheels having cushioned rims slidably and rotatably mounted upon the inclined portions of the shaft so as to bring the peripheries of the cushioned rims closer together at the bottom than at the top thereof for the purpose of engaging a growing beet between the lower portions of the said rims and pulling the beet from the ground as the said rims rotate; traction wheels rotatably mounted upon the horizontal portions of the shaft; bevel gears secured to the traction wheels; bevel gears rotatably mounted upon the inclined portions of the shaft and constantly in mesh with the bevel gears on the traction wheels; sliding connections between the gears on the inclined portions of the shaft and the cushioned wheels thereon adapted to rotate the said cushioned wheels; means for altering the distance between the cushioned wheels without altering the angle thereof; a bifurcated ground breaker rotatably secured to the front of the frame and adapted to break the ground on both sides of a growing beet row; means for partially rotating the ground breaker; means for elevating the ground breaker; arcuate plates pivotally suspended between the cushioned rims and adapted to engage the sides of the top of a growing beet for the purpose of controlling the distance that the said beet shall project inside of the cushioned rims; extensions secured to the arcuate plates adapted to engage the adjacent sides of the cushioned wheels for the purpose of regulating the position of the said arcuate plates; a knife suspended between the cushioned wheels and adapted to cut the top from the beet and just below the arcuate plates; and an inclined plate adapted to deflect the severed beet top to one side of a beet row.

In witness whereof I hereunto set my signature in the presence of two subscribing witnesses.

ANDREW C. DOUGLASS.

Witnesses:
GEO. SCHMITZ,
JAMES F. McCUE.